United States Patent Office 2,847,280
Patented Aug. 12, 1958

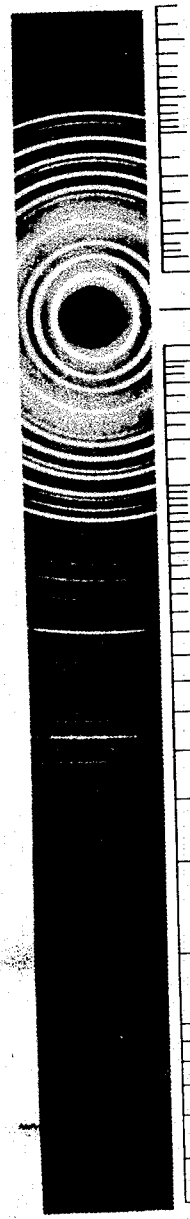

2,847,280

PRODUCTION OF SELECTIVE MINERAL SORBENTS

John H. Estes, Wappingers Falls, N. Y., assignor to The Texas Company, New York, N. Y., a corporation of Delaware Application October 23, 1956, Serial No. 617,735

8 Claims. (Cl. 23—113)

This invention relates to a process for production of a selective mineral sorbent having the empirical formula $Na_2O \cdot Al_2O_3 \cdot 2SiO_2 \cdot 4\text{-}5H_2O$.

This sorbent has the property of selectively sorbing vapors of lower molecular weight materials such as water, ethane, ethylene, and propylene from mixtures of the same with larger molecules, e. g. non-straight chain hydrocarbons such as isoparaffinic, isoolefinic, naphthenic, and aromatic hydrocarbons. It is characterized broadly as having an effective pore size of approximately 4 Angstrom units, and, for convenience herein, will be called the 4 A. mineral sorbent. By ion exchanging a proportion of sodium component for certain divalent metal ions, e. g. calcium, zinc, cadmium, manganese, or strontium in the structure of this 4 A. mineral sorbent, the effective pore size can be made to increase to about 5 Angstrom units. The resulting mineral sorbent, for convenience herein called a 5 A. mineral sorbent, is useful in separating higher molecular weight normal paraffins, olefins, etc. from non-straight chain hydrocarbons, e.g. normal butane from isobutane, normal hexane from isoparaffinic hexanes, cyclohexane, and benzene, etc. In such process the selective mineral sorbent is contacted with the hydrocarbon mixture whereby it becomes laden with the straight-chain material; the laden sorbent can then be stripped, e. g. at elevated temperature with a light gas such as nitrogen, and sorbed materials recovered.

My process produces a highly pure and effective 4 A. sodium alumino-silicate using low-cost commercially available materials. This process comprises forming a mixture of hydrous silica and by-product sodium salt by reacting an aqueous solution of sodium silicate with a substance selected from the group consisting of $CO_2$, $SO_2$, $H_2S$, the sodium hydrogen salts of their corresponding acids, and mixtures of same; adding sodium aluminate to said mixture in an amount sufficient to establish the proportions of aluminum and silicon in the resulting mixture essentially stoichiometric for the formulation $Na_2O \cdot Al_2O_3 \cdot 2SiO_2$; aging the resulting mixture for at least about 8 hours and not more than about 160–170 hours at a temperature not substantially above about 100° F.; thereafter maintaining the aged mixture under autogenous pressure at a temperature of 150–325° F. for at least about 3 hours; and recovering the hydrated sodium alumino-silicate as the resulting solid fraction.

The particularly useful sodium silicate solutions are broadly 6.5 to 25 percent by weight solutions of sodium silicate in water having an equivalent $SiO_2$ concentration of about 5 to about 20 weight percent, and preferably of about 10 weight percent. The latter solution is made by diluting one volume of commercial sodium silicate solution having an equivalent $SiO_2$ concentration of about 30 weight percent with two volumes of water.

Generally, the acidic gas is simply added until the sodium silicate solution gels. Temperature of the operation can be from about 34° to about 100° F. When gelation occurs the change is quite sudden, and the treatment with the acidic gas is discontinued. The acidic gas can be bubbled in as a gas or added as a liquid or solid if available, e. g. $CO_2$ can be added to the solution in the form of Dry Ice. For efficiency and economy in practice of my process I prefer to use $CO_2$ and especially flue gases containing $CO_2$ for this operation, but I also can use $CO_2$ and $H_2S$ alone, or mixed, or as components of waste and flue gas streams.

The gelation step can be accelerated by operating under pressure with mechanical agitation, and further accelerated by treating only one-half the sodium silicate solution with the gas until an acid salt by-product is formed, e. g. sodium bicarbonate, bisulfite, and/or acid sulfide, then mixing the reserved portion of the sodium silicate solution with gas-treated portion.

When the hydrous silica has been formed, the required amount of sodium aluminate is added thereto. The sodium aluminate can be substantially pure, but the kind I prefer to use is a cheaper material, the commercial grade of $2NaAlO_2 \cdot 3H_2O$, a dry solid, which is conventionally rendered more soluble in water by the incorporation therein of about 2–5 percent by weight free NaOH. To compensate for the solubilizing quantity of caustic soda so added to the reaction mixture it is necessary, for stoichiometry of the reaction, to add additional hydrous alumina, e. g. a commercially available alumina sol or gel, represented conventionally by the formula $Al_2O_3 \cdot YH_2O$. Such material can contain up to about 20 percent $Al_2O_3$. The reactants are mixed at about room temperature, for convenience, and a thick creamy reaction mixture is formed. Additional water can be added if desired to facilitate mixing. The proportion of water (i. e., free water and water of hydration) in the reaction mixture is advantageously at least about 75 percent by weight of the total reaction mixture and is preferably 80–90 percent.

It is most important that the quantities of reactants used are sufficient to establish proportions of aluminum and silicon in the resulting mixture essentially stoichiometric for the formulation $Na_2O \cdot Al_2O_3 \cdot 2SiO_2$, i. e., the molar excess of equivalent silica or alumina in the reaction mixture should not be substantially greater than 5–10 percent. The reaction mixture, of course, contains some by-product sodium salt formed during the previous gelation step by the reaction of the sodium silicate with the gas. This material is not separated, but remains in solution and assists in the flocculation and filtration of the resultant hydrated 4 A. sodium alumino-silicate formed in the subsequent operations.

After the reaction mixture has been made up, it is allowed to stand at room temperature for at least about 8 hours, and preferably from 24 to 72 hours at temperature not substantially above about 100° F., and preferably at about room temperature. Omission of this aging step results in a less pure product, perhaps by not allowing the mixture sufficient time to form the most desirable kind of crystal nuclei. Aging for longer than about 160–170 hours leads to contamination of the desired 4 A. product with a material having apparent pore diameter of about 13 A. Use of temperature substantially above about 100° F. in this aging step defeats the aging process by hastening onset of the principal conversion.

After aging, the reaction mixture is maintained at about 150–280° F. and autogenous pressure for at least about 3 hours, and preferably for about 4–24 hours. Reaction time of 4 or more hours appears to give a crystalline particle which is most readily separable from the mother liquor. At temperatures substantially below about 150° F., the reaction is sluggish, and above about 325° F. the synthetic sorbent is not likely to be formed in the desired highly pure state, but rather some analcite, a distinctly inferior selective sorbing material will be formed in contaminating quantities along with other impurities. Preferably the reaction temperature is maintained between 220° F. and 275–280° F. for a period of 4–24 hours in a closed reactor whereby water vapors are confined and exert pressure. Steady mechanical agitation of the reaction mixture during the heating step is preferred to obtain the purest kind of product, but a quite satisfactory product can be made with little or no agitation.

The reaction of sodium silicate with the acid anhydride gas can be represented by the following equation wherein the acid anhydride gas used is carbon dioxide:

(1)
$$\underset{\substack{\text{sodium} \\ \text{silicate}}}{Na_2Si_4O_9} + \underset{\substack{\text{carbon} \\ \text{dioxide}}}{CO_2} \xrightarrow{\text{water}} \underset{\substack{\text{hydrous} \\ \text{silica}}}{4SiO_2 \cdot xH_2O} + \underset{\substack{\text{sodium} \\ \text{carbonate}}}{Na_2CO_3}$$

The reaction between the hydrous silica so formed and sodium aluminate can be illustrated as follows:

(2)
$$\underset{\substack{\text{sodium} \\ \text{aluminate}}}{2SiO_2 \cdot xH_2O} + \underset{\substack{\text{and} \\ \text{sodium} \\ \text{carbonate}}}{2NaAlO_2 \cdot 3H_2O} \xrightarrow{\text{water}} \underset{\text{hydrated alumino-silicate}}{Na_2O \cdot Al_2O_3 \cdot 2SiO_2 \cdot 4\text{-}5H_2O}$$

Because of the solubilizing quantity of free sodium hydroxide conventionally present in the sodium aluminate, e. g. about 5 percent of free sodium hydroxide by weight, it is necessary to add slightly less sodium aluminate in proportion to the silica gel present than is shown in Equation 2, above, and to make up the difference in the alumina-providing material with hydrous alumina. The reaction of free caustic soda with hydrous alumina and hydrous silica can be represented by the following equation:

(3)
$$\underset{\substack{\text{sodium} \\ \text{hydroxide}}}{2NaOH} + \underset{\substack{\text{hydrous} \\ \text{alumina}}}{Al_2O_3 \cdot YH_2O} + \underset{\substack{\text{hydrous} \\ \text{silica}}}{2SiO_2 \cdot xH_2O} \xrightarrow{\text{water}}$$
$$Na_2O \cdot Al_2O_3 \cdot 2SiO_2 \cdot 4\text{-}5H_2O$$

It is most important that the quantities of sodium silicate, sodium aluminate (and hydrous alumina if the aluminate contains appreciable solubilizing caustic soda) used be in as closely stoichiometric proportions for the formulation $Na_2O \cdot Al_2O_3 \cdot 2SiO_2$ as is possible using conventional metering equipment. Excessive sodium silicate can be eventually converted into free silica which can remain in the reaction product, or be converted into compounds such as $Na_2O \cdot Al_2O_3 \cdot 3SiO_2 \cdot 2H_2O$ or $Na_2O \cdot Al_2O_3 \cdot 4SiO_2 \cdot 2H_2O$ (analcite) thus contaminating the end product and drastically impairing the selectivity of a 5 A. sorbent for straight chain hydrocarbons from mixtures of straight chain and non-straight chain hydrocarbons which is made from such impure 4 A. sorbent product. Excess alumina-providing material, i. e., sodium aluminate and/or hydrous alumina in the reaction mixture can be converted into several types of free aluminum oxide, depending on the original source of the alumina-providing material and subsequent treatment of the resulting 4 A. sorbent product, and can similarly impair the selectivity of a 5 A. sorbent made therefrom.

After the reaction period at elevated temperature, the subject 4 A. sodium alumino-silicate in a hydrated state is present as a crystalline solid fraction, and this fraction is separated from the saline mother liquor most simply by filtration. Other solids separation techniques such as settling, centrifuging, or the like can be used also to separate the freshly-formed crystalline solid. The separated solid can be rinsed with water or an organic solvent such as acetone or alcohol to remove occluded foreign material. The presence of the by-product sodium salt in solution from the first step of the process assists in separating this hydrated 4 A. crystalline solid by causing flocculation of the finely-divided particles. The separated solid can be air-dried conveniently to remove dampness from the rinsing to leave the subject 4 A. mineral sorbent containing 4–5 molecules of water of hydration.

The separated hydrated 4 A. crystalline material can be virtually completely dehydrated simply by calcining in air at a temperature of 220° to 1000° F. Use of temperatures substantially above about 1000° F. in this operation causes collapse of the structure and loss of selective sorbent properties. Preferably for efficiency and economy in dehydrating, the temperature used is 300°–600° F. If desired, sub-atmospheric pressure can be used in the dehydration, but atmospheric pressure calcining is preferred. It is advantageous during dehydration to sweep water vapor from the heater with a current of air or other gas.

The resulting dehydrated mineral sorbent, having the formula $Na_2O \cdot Al_2O_3 \cdot 2SiO_2$ and containing no appreciable water, is a fine powder. For use in processing of straight chain hydrocarbons these fine particles are best agglomerated, e. g. by pelleting or extruding through a die with a suitable binder. The fine particles can be agglomerated and stabilized for greater strength, for example by processes described in the following copending U. S. patent applications: Riordan et al., Serial No. 544,244, filed on November 1, 1955, assigned to The Texas Company; Hess et al., Serial No. 544,185, filed on November 1, 1955, also assigned to The Texas Company; and Ray, Serial No. No. 599,231, filed on July 20, 1956, assigned to The Texas Company.

The drawing is a reproduction of a typical X-ray diffraction pattern of a fully hydrated sodium alumino-silicate made by my process. The X-ray diffraction pattern does not agree with that of any of more than 1000 natural minerals and synthetic chemicals available for comparison.

The hydrated 4 A. mineral sorbent can be converted into a calcium sodium alumino-silicate, $$(Ca,Na_,)O \cdot Al_2O_3 \cdot 2SiO_2 \cdot 4\text{-}5H_2O$$

having an effective pore size or diameter of about 5 Angstrom units by base exchanging sodium in the structure for calcium, and thereafter dehydrating as described hereinbefore. In such operation at least 25 percent and preferably 40–80 percent of the sodium in the original 4 A. material should be replaced by calcium. A simple way to conduct the base exchange is to wash the uncalcined mineral sorbent substantially free of any retained alkali with water and then agitate it for one-half hour to two days in, for example 0.1–5 N aqueous calcium chloride solution, discarding the calcium chloride solution, and repeating this treatment with fresh calcium chloride solution until the necessary proportion of the sodium originally present in the structure has been replaced by calcium. Operating at room temperature and pressure 4–6 changes of 0.1 N calcium chloride solution are usually adequate to obtain sufficient calcium substitution. After calcining, the resulting 5 A. mineral sorbent can be agglomerated and/or stabilized as hereinbefore set forth.

The following examples show ways in which my invention as been practiced, and should not be construed as limiting the invention. The X-ray diffraction patterns of the hydrated sodium alumino-silicates produced in each of the following preparations did not differ significantly from the pattern shown in the drawing.

*Example 1.*—100 grams of 40° Baumé sodium silicate solution containing 28.5% $SiO_2$, known in the trade as water glass, was diluted with 200 ml. of water, then treated with $CO_2$ until a gel of silicic acid formed. 65 grams of commercial grade sodium aluminate consisting of $2NaAlO_2 \cdot 3H_2O$ with 2.85% free NaOH was dissolved in 150 ml. of water. This solution was mixed thoroughly with the previously-formed silicic acid gel-containing mixture and 20 grams of alumina hydrogel containing 16% $Al_2O_3$. The mixture allowed to stand for 48 hours at room temperature, then heated in a closed vessel to 250° F. for 16 hours. At the end of this period the resulting crystalline solid fraction was collected by filtration, washed with water to remove soluble salts, and air dried, this product being 100 grams of the synthetic zeolite $Na_2O \cdot Al_2O_3 \cdot 2SiO_2 \cdot 4-5H_2O$.

In a modification of the above procedure, sodium bicarbonate was used as the gelling agent of the diluted sodium solution. The resulting gel mixture was washed with water to reduce the sodium carbonate content to substantially that of the gel mixture made by the preparation shown in Example 1. The remainder of the procedure was carried out in a manner similar to the preparation shown in Example 1. The crystalline solid fraction recovered was like that of Example 1.

The procedure of Example 1 can also be modified to utilize sodium bisulfite and/or sodium hydrogen sulfide as the gelling agent in similar manner, or to augment the useful acidic gases. However, when sodium salts such as sodium bicarbonate alone or mixed with sodium bisulfite and/or sodium hydrogen sulfide are used, it is advantageous to extract about ⅓ to ½ of the resulting normal sodium salt by-product made thereby out of the gelled mixture before mixing it with the sodium aluminate.

*Example 2.*—100 grams of 40° Baumé sodium silicate solution containing 28.5% $SiO_2$ and known in the trade as water glass, was diluted with 200 ml. of water, then treated with $H_2S$ gas until a gel of silicic acid formed. The gelled material was colored somewhat by the impurities present in the commercial silicate solution. 65 grams of a commercial grade sodium aluminate consisting of $2NaAlO_2 \cdot 3H_2O$ with 2.85% free NaOH was dissolved in 150 ml. of water. This solution and 20 grams of alumina hydrogel containing 16% $Al_2O_3$ was mixed thoroughly with the previously-formed silicic acid gel. The mixture was allowed to stand for 48 hours after which it was heated in a closed vessel to 250° F. for 16 hours. At the end of this period, the resulting crystalline solid fraction was collected by filtration, washed with water to remove soluble salts, and air dried, this product being 98 grams of the synthetic zeolite $Na_2O \cdot Al_2O_3 \cdot 2SiO_2 \cdot 4-5H_2O$.

*Example 3.*—100 grams of 40° Baumé sodium silicate solution containing 28.5% $SiO_2$ was diluted with 200 ml. of water, then treated with $SO_2$ gas until a gel of silicic acid formed. 65 grams of a commercial grade sodium aluminate consisting of $2NaAlO_2 \cdot 3H_2O$ with 2.85% free NaOH was dissolved in 150 ml. of water. This solution and 20 grams of alumina hydrogel containing 16% $Al_2O_3$ was mixed thoroughly with the previously-formed silicic acid gel. The mixture was allowed to stand for 48 hours after which it was heated in a closed vessel to 250° F. for 16 hours. At the end of this period, the resulting crystalline solid fraction was collected by filtration, washed with water to remove soluble salts, and air dried, this product being 95 grams of the synthetic zeolite $Na_2O \cdot Al_2O_3 \cdot 2SiO_2 \cdot 4-5H_2O$.

*Example 4.*—100 grams of the 4 A. air-dried synthetic zeolite, made in the manner of Example 1, was suspended in 600 ml. of aqueous 0.1 N $CaCl_2$ solution which had been made alkaline by the addition of a small amount of calcium hydroxide. After 15 minutes of stirring, a sample of the suspended material was taken for identification, and the remainder resuspended in fresh aqueous 0.1 N $CaCl_2$ solution. A total of six changes of solution were made. The course of the ion exchange of calcium for sodium in the zeolite was observed by a study of the samples taken before each change of solution. Four changes of 0.1 N $CaCl_2$ solution appeared to convert the 4 A. zeolite to a zeolite having effective pore size or diameter of about 5 A.

Samples of the suspended material taken after four changes and six changes, respectively, of the 0.1 N $CaCl_2$ solution were dehydrated at 400° F., and the capacity of these dehydrated materials for n-butane and isobutane were measured. The capacities in cc. of the hydrocarbon gases at 75° F. and 760 mm. Hg pressure per gram of dehydrated sorbent were as follows:

| Changes of Solution | Isobutane | n-butane |
|---|---|---|
| 4 | 5.4 | 47.0 |
| 6 | 2.9 | 43.0 |

In the foregoing examples all percentages, unless otherwise specified, are weight percentages.

I claim:

1. A process for production of synthetic crystalline zeolite characterized by the empirical formula $$Na_2O \cdot Al_2O_3 \cdot 2SiO_2 \cdot 4-5H_2O$$

and an effective pore size of 4 A. upon dehydration which comprises forming a mixture of hydrous silica and by-product sodium salt by reacting an aqueous solution of sodium silicate with at least one substance selected from the group consisting of $CO_2$, $SO_2$, $H_2S$, sodium bicarbonate, sodium bisulfite, and sodium hydrosulfide; adding sodium aluminate to said mixture in an amount sufficient to establish the proportions of aluminum and silicon in the resulting mixture stoichiometric for the formulation $Na_2O \cdot Al_2O_3 \cdot 2SiO_2$; aging the resulting mixture for 8–170 hours at a temperature not substantially above about 100° F.; thereafter maintaining the aged mixture under autogenous pressure at a temperature of 150°–325° F. for at least about 3 hours; and recovering said crystalline zeolite as the resulting solid fraction.

2. The process of claim 1 wherein said substance is $CO_2$.

3. The process of claim 1 wherein said substance is $SO_2$.

4. The process of claim 1 wherein said substance is $H_2S$.

5. The process of claim 1 wherein the sodium aluminate used contains a solubilizing quantity of sodium hydroxide, and said solubilizing quantity of sodium hydroxide is compensated for by incorporating hydrous alumina into the said resulting mixture.

6. The process of claim 5 wherein the aging of said resulting mixture is done at about room temperature for about 24–72 hours, and thereafter said resulting mixture is maintained between 220°–280° F. for about 4–24 hours.

7. The process of claim 6 wherein the aqueous sodium silicate is reacted with flue gases.

8. The process of claim 1 wherein said substance is sodium bicarbonate.

References Cited in the file of this patent

UNITED STATES PATENTS 1,945,838    Vaughan _____ Feb. 6, 1934

UNITED STATES PATENT OFFICE
CERTIFICATE OF CORRECTION

Patent No. 2,847,280                                                         August 12, 1958

John H. Estes

It is hereby certified that error appears in the printed specification of the above numbered patent requiring correction and that the said Letters Patent should read as corrected below.

Column 2, line 6, for "$CO_2$ and $H_2S$" read -- $SO_2$ and $H_2S$ --.

Signed and sealed this 21st day of October 1958.

(SEAL)
Attest:
KARL H. AXLINE

Attesting Officer

ROBERT C. WATSON
Commissioner of Patents

UNITED STATES PATENT OFFICE
CERTIFICATE OF CORRECTION

Patent No. 2,847,280                             August 12, 1958

John H. Estes

It is hereby certified that error appears in the printed specification of the above numbered patent requiring correction and that the said Letters Patent should read as corrected below.

Column 2, line 6, for "$CO_2$ and $H_2S$" read -- $SO_2$ and $H_2S$ --.

Signed and sealed this 21st day of October 1958.

(SEAL)
Attest:
KARL H. AXLINE
Attesting Officer

ROBERT C. WATSON
Commissioner of Patents